G. P. A. WEISENBORN.
PLANT BLOCKER.
APPLICATION FILED MAY 6, 1911.
1,025,223.
Patented May 7, 1912.
2 SHEETS—SHEET 1.
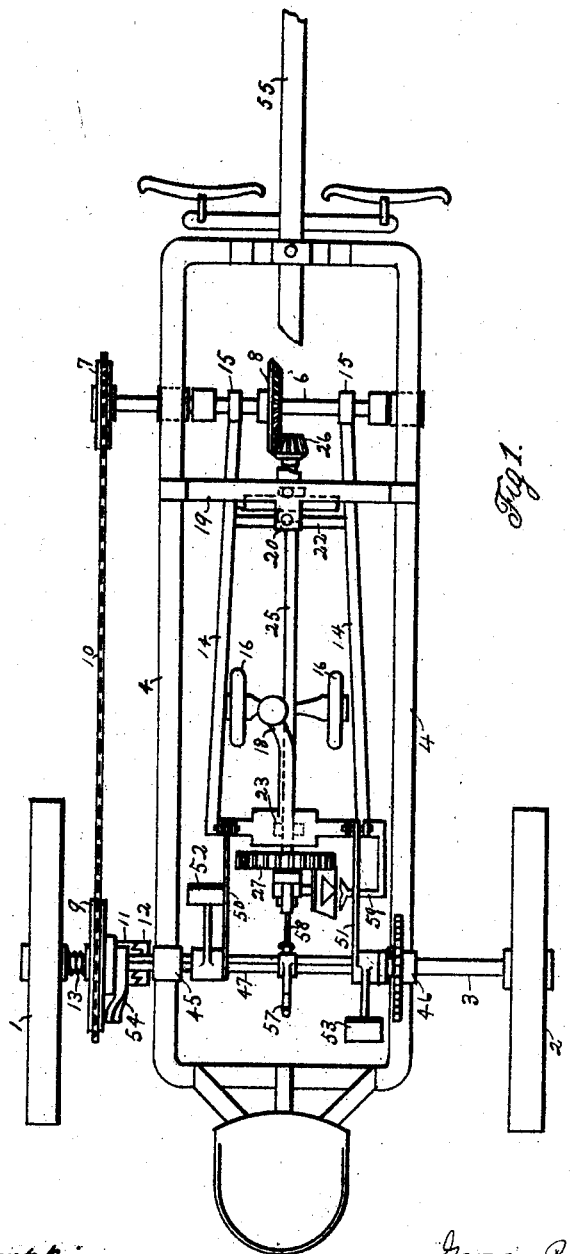

G. P. A. WEISENBORN.
PLANT BLOCKER.
APPLICATION FILED MAY 6, 1911.
1,025,223.
Patented May 7, 1912.
2 SHEETS—SHEET 2.
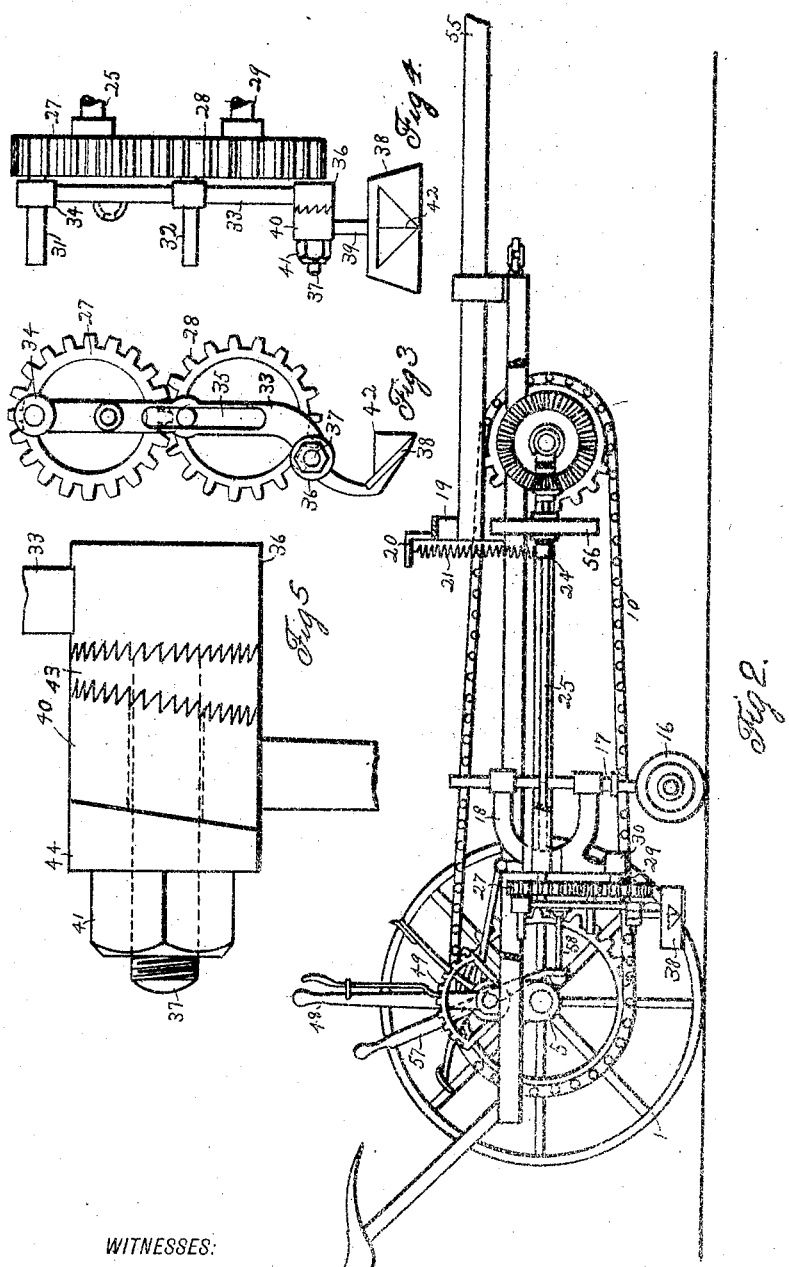
WITNESSES:
INVENTOR
BY
ATTORNEYS

UNITED STATES PATENT OFFICE.

GEORGE P. A. WEISENBORN, OF HOUSTON, TEXAS.

PLANT-BLOCKER.

1,025,223.  Specification of Letters Patent.  Patented May 7, 1912.

Application filed May 6, 1911. Serial No. 625,575.

*To all whom it may concern:*

Be it known that I, GEORGE P. A. WEISENBORN, a citizen of the United States, residing at Houston, in the county of Harris and State of Texas, have invented certain new and useful Improvements in Plant-Blockers, of which the following is a specification.

My invention relates to new and useful improvements in plant blockers such as are designed to block plants which grow in rows.

The object of the invention is to provide a device of the character described having an oscillating hoe, or cutter, secured to an operative mechanism therefor, said mechanism being operatively connected with the carrier wheels of the machine in such a manner as to be operated thereby, and the invention further comprehends a means for disconnecting the hoe-operative-mechanism from its motive means.

Another object of the invention resides in the provision of a means whereby the hoe may be readily elevated and lowered and locked in position at any desired point of elevation.

A further feature of the device resides in the provision of means for securing the hoe to its operative mechanism, whereby the angle of the cutting edge of said hoe with the surface to be cut away may be varied.

A still further feature resides in the provision of a mechanism whereby the hoe may be readily shifted rearwardly or forwardly on its support.

With the above and other objects in view my invention has particular relation to certain novel features of construction, operation and arrangement of parts an example of which is given in this specification and illustrated in the accompanying drawings, wherein:—

Figure 1 is a plan view of my device. Fig. 2 is a side elevation thereof, showing one of the carrier wheels and a portion of the frame work removed so as to show more clearly the operative mechanism of the machine. Fig. 3 is a side elevation of the hoe operative mechanism, showing the hoe attached thereto. Fig. 4 is a view in elevation of the hoe operative mechanism taken from the side of the machine, and Fig. 5 is an enlarged view, showing my preferred form of attachment for securing the hoe to its supporting arm.

Referring now more particularly to the drawings, wherein like numerals of reference designate similar parts in each of the figures, the numerals 1 and 2 refer, respectively, to the carrier wheels of the device, which support the axle 3 with which they rotate, while the machine is moving forward. The axle 3 supports the rear end of the frame work 4 and is rotatable in suitable bearings 5 depending from said frame work. This framework is composed of suitable side and end members and is constructed of steel or some other similar durable material and extends forwardly from the axle 3 and is designed to support the operative mechanism of the machine.

Rotatably mounted in suitable bearings near the front end of the frame work 4 is the transverse shaft 6, one end of which carries the rigidly mounted sprocket wheel 7 and near the center of which is carried the rigidly mounted bevel gear 8. Loosely mounted on the axle 3 and alined with the sprocket wheel 7 is the sprocket wheel 9 and the sprocket wheels 7 and 9 are operatively connected by the sprocket chain 10. The hub of sprocket wheel 9 is extended inwardly, forming a clutch member 11 and rigidly mounted on the axle 3 is a similar clutch member 12, these clutch members are normally held in engagement by means of a strong coil spring 13 interposed between the inner end of the hub of carrier wheel 1 and the outer end of the hub of sprocket wheel 9 and surrounding the axle 3, but the said clutch is arranged to be disengaged in a manner hereinafter to be described and when so disengaged the sprocket wheel 9 will cease to rotate and the operative mechanism of the machine remain idle.

The numeral 14 designates a U shaped frame, the open end of which looks toward the front of the machine and carries suitable bearings 15 in which the shaft 6 rotates and the rear end of this frame is supported by suitable rollers 16 which are carried upon the lower end of a shank 17, the said shank being secured in a bearing member 18, carried by the rear end of the frame 14, in which said shank is vertically adjustable. The frame work 4 carries an inverted U shaped cross-bar 19, near the front end thereof, which extends transversely of the frame work and is secured to each side thereof and integral with the central portion of said cross-bar and projecting rearwardly therefrom is a support 20 to which a strong coil spring 21 is attached at its upper end and the lower end of this coil spring is secured to a cross bar 22 extending transversely of the frame 14 and immediately underneath the support 20, and this coil spring serves the purpose of suspending the frame 14 from the support 20 and makes said frame and the appendants thereof easily elevated by the operator and also serves to relieve the runners 16 of a portion of the weight of said frame and the mechanism carried thereby.

Extending lengthwise of the frame 14 and rotatably mounted in suitable bearings 23 and 24 carried by the rear end thereof and the cross-bar 22, respectively, is the shaft 25. Rigidly mounted on the front end of this shaft is the bevel gear 26 which meshes with the bevel gear 8 and rigidly mounted on the rear end of the shaft is the spur gear 27. The spur gear 27 meshes with a similar spur gear 28, located therebeneath and rotatably mounted on a spindle 29 extending rearwardly from the spindle support 30 which depends from the rear end of the frame 14.

Extending rearwardly from the gear wheels 27 and 28 are the pins 31 and 32, located in corresponding positions on said gear wheels provided to support the arm 33. The upper end of this arm carries a bearing member 34, through which the pin 31 extends and the pin 32 projects through an oblong slot 35 in the arm 33, and the pins 31 and 32 are of sufficient length to permit a considerable forward and rearward movement of the arm 33 thereon for a purpose to be hereinafter set forth. The lower end of the arm 33 is enlarged into a clutch member 36 and extending laterally from the center of this clutch member is the shaft 37.

The numeral 38 refers to a hoe, or cutter, secured to the lower end of shank 39. The upper end of this shank carries a clutch member 40 which is provided with a central opening through which the shaft 37 extends and the member 40 is held secured on said shaft 37 by means of a nut 41, the contacting sides of the clutch members 36 and 40 being provided with engaging teeth, as shown in Fig. 4, which are held in engagement by means of the nut 41 and the hoe 38 is thus held rigid with respect to the arm 33, but when it is desired to vary the angle between shank 39 and arm 33 the nut 41 may be loosened and the clutch member 40 turned to the desired position on its supporting shaft 37 and said nut again tightened until the clutch members are again engaged securely together. The front side of the hoe 38 is provided with an auxiliary cutter 42, projecting forwardly therefrom and having a vertically extending cutting edge and sides which slope each way therefrom. This auxiliary cutter is provided to separate the earth and throw the same in each direction therefrom and around the plants left standing immediately in the front and rear of the hoe 38.

In Fig. 5 is shown a construction for securing the hoe 38 to its arm 33, which is a modification of the form shown in Fig. 4. In this form I have interposed between the clutch members 36 and 40 a wedge shaped washer 43, having rack teeth on each side so as to readily engage with the clutch members between which it is interposed, and between the nut 41 and clutch member 40 I have interposed a plane wedge shaped washer 44 of similar dimensions to the washer 43, but so arranged that the thin side thereof will correspond in position, relative to the clutch members 36 and 40, to the thick side of wedge 43. When it is desired to vary the angle of the cutting edge of hoe 38 relative to the surface to be cut away the nut 41 may be loosened and the washers 43 and 44 given an equal turn on the shaft 37 and the angle of the cutting edge of the hoe 38 thus varied at will. The opening through the clutch member 40 should be considerably larger than the shaft 37, as shown in dotted lines in Fig. 5, in order to allow a certain amount of play for said clutch member relative to said shaft.

Rotatably mounted in suitable bearings 45 and 46, carried by the side members of the frame work 4, and immediately over the axle 3 is the square shaft 47. One end of this shaft carries the hand lever 48, which is rigid therewith and by means of which the same may be rotated. This hand lever is provided with the usual rack-and-dog arrangement 49, by means of which said lever may be secured in any desired position. Rigidly secured to the shaft 47 are the forwardly extending levers 50 and 51, the forward ends of which are hingedly secured to the rear end of the frame 14, one on each side, and as said shaft 47 is rotated through the manipulation of lever 48 the levers 50 and 51 operate to elevate or lower the frame 14 and the appendants carried thereby. Near each end of the shaft 47 but within the frame work 4 are the pedals 52 and 53, rigidly secured to said shaft, the former extending forwardly and the latter extending rearwardly. By a depression of pedal 52 the shaft 47 is rotated, the front ends of levers 50 and 51 depressed and the frame 14 lowered and by a depression of pedal 53 the frame 14 is, in a similar manner elevated. The position of the frame 14 and the hoe operating mechanism carried thereby, may be readily controlled by either the feet or the hands of the operator, and said frame may be secured at any desired point of elevation by the rack-and-dog arrangement 49. Adjacent to the inner end of the hub of the sprocket wheel 9 and rigidly mounted on the shaft 47 is a declutch 54, whose outer face inclines outwardly and by a rearward manipulation of hand lever 48 or a depression of pedal 53 the said declutch 54 may be made to press against the inner end of the hub of sprocket wheel 9 and slide said wheel on the axle 3 and against the tension of spring 13 until the clutch member 11 is declutched from the clutch member 12 and throws the operative mechanism of the machine out of gear. To the front end of the frame work 4 I have secured the tongue 55, which supports the whiffle trees to which the team may be hitched in the usual manner.

This machine is specially designed to be used in chopping cotton and other similar growing plants, which are planted in rows. In the cultivation of said plants it becomes necessary to remove some of the plants of the row, when standing too thick, and to leave the remainder of said plants standing in "hills", and this object may be readily accomplished by the use of a machine of the character described, the cutting hoe of which operates at regular intervals and at right angles to the row over which the machine is passing, and performs a stroke very similar to the movement of a hoe, when used by a man in digging, and the shaft 25 is provided with a heavy fly wheel 56, rigidly mounted thereon near the front end thereof, which imparts a considerable amount of momentum to said hoe and renders the strokes thereof more uniform.

Loosely mounted on the shaft 47 is a hand lever 57, which extends upwardly therefrom so as to be within easy reach of the operator. The lower end of this lever extends some distance below the shaft 47, and is connected to the arm 33 by means of a link 58, which is connected to both said lever and said arm by means of universal joints, so as to permit the free oscillation of said arm. By the manipulation of said lever 57 the arm 33 may be moved back and forth on the pins 31 and 32 and the position of the hoe 38 may thus easily be shifted toward the front or rear, in order to avoid obstruction or to be made to miss any plant in the row which the operator may not desire to have cut.

For the purpose of cleaning the hoe from any earth that may adhere thereto I have provided the scraper 59, which is secured to the frame 14 and which projects out toward the hoe and whose free end is enlarged and conforms in shape to the face of the hoe. This scraper projects out from the frame a sufficient distance to come in contact with the hoe just at the time it has finished its stroke and is moving upward to begin a new stroke and scrapes off the earth and leaves the hoe clean.

What I claim is:—

1. A device of the character described composed of suitable carrier wheels rigidly mounted upon a rotatable axle, a frame work supported by said axle, a frame hingedly secured to the frame work and carrying a hoe-operative mechanism, an oscillating lever pivotally secured to said mechanism and a hoe carried thereby, a driving means operatively connected with said carrier wheels and also having operative connection with said hoe-operative mechanism, means for disconnecting said first mentioned means from said carrier wheels, and means for adjusting said oscillating arm and the hoe carried thereby, at any time, relative to the hoe-operative mechanism.

2. A device of the character described including suitable carrier wheels rigidly mounted upon an axle and a frame work supported by said axle, a supporting frame hingedly secured to said frame work near the front end thereof, a mechanism carried by the rear end of said frame work and connected to the rear end of said frame, whereby said frame may be elevated and lowered, a hoe-operative mechanism carried by said frame and having operative connection with one of said carrier wheels, a means for disconnecting said connection, an oscillating arm pivoted to said hoe-operative mechanism and operated thereby, a hoe secured to said oscillating arm, and means for manually adjusting said oscillating arm and the hoe carried thereby relative to the hoe-operative mechanism.

3. A device of the character described including a rotatable axle and carrier wheels rigidly secured thereto, a frame work supported by said axle, a supporting frame hingedly secured to said frame work near the front end thereof and a means carried by the frame work and having connection with the frame whereby the rear end thereof may be elevated and lowered relative to the frame work, a resilient member secured to the frame work and also to the frame and operating to suspend said frame from the frame work, a hoe-operative mechanism carried by said frame and having operative connection with one of said carrier wheels, a means for disconnecting said connection, an oscillating arm pivoted to said hoe-operative mechanism and operated thereby, a hoe secured to said oscillating arm, and means for adjusting said oscillating arm and the hoe carried thereby relative to the hoe-operative mechanism either while stationary or in motion.

4. In a device of the character described a train of spur gears and an oscillating arm pivotally secured to one of said gears and slidably secured to the other, a hoe secured to said oscillating arm and means whereby the position of the hoe may be varied relative to said arm.

A device of the character described including a rotatable axle and carrier wheels rigidly secured thereto, a frame work supported by said axle, a supporting frame hingedly secured to said frame work and a resilient member secured to said frame work and frame and suspending the latter from the former, a means carried by the frame work and having connection with the frame whereby the frame may be elevated and lowered relative to the frame work and secured in a fixed position with relation thereto, a hoe operative mechanism carried by said frame and having operative connection with one of said carrier wheels, a means for disconnecting said connection, an oscillating arm pivoted to said hoe-operative mechanism and operated thereby, a hoe secured to said oscillating arm, means securing said hoe to said arm whereby the position of the hoe may be varied relative to the arm, and means for manually adjusting said oscillating arm, and the hoe carried thereby relative to the hoe-operative mechanism.

6. A device of the character described composed of suitable carrier wheels rigidly mounted on a rotatable axle, a frame work supported by said axle, a frame hingedly secured to the frame work and carrying a hoe operative mechanism and a fly wheel connected therewith and designed to steady the operation thereof, an oscillating arm pivotally secured to said mechanism and a hoe carried thereby, a driving means operatively connected with one of said carrier wheels and also having operative connection with said hoe operative mechanism, means for disconnecting said driving means from said carrier wheel and a mechanism operatively connected to said oscillating arm for changing the position of said arm and the hoe carried thereby at any time relative to the hoe operative mechanism.

7. A device of the character described composed of suitable carrier wheels rigidly mounted upon a rotatable axle, a frame work supported by said axle, a frame hingedly secured to the frame work, a hoe-operative mechanism carried by said frame, an oscillating arm pivotally secured to said mechanism and operated thereby and a hoe secured to said arm, a means operatively connected with one of said carrier wheels and also having operative connection with said hoe-operative mechanism and operating the same, means for disconnecting said first mentioned means from said carrier wheels, means connecting said hoe to said arm whereby the position of the hoe relative to the arm may be changed and means operatively connected with said arm whereby the arm and the hoe carried thereby may be readily shifted at any time relative to the hoe-operative mechanism.

8. A device of the character described including a frame work pivotally mounted upon a rotatable axle and carrier wheels rigidly secured to said axle, a supporting frame hingedly secured to said frame work, a transverse shaft rotatable in suitable bearings carried by said frame work and a lengthwise shaft rotatably mounted in suitable bearings in said frame, means operatively connecting one of said carrier wheels with said transverse shaft and means for disconnecting said connection, means operatively connecting said transverse and said lengthwise shafts, a hoe-operative mechanism carried by said frame and operatively connected with said lengthwise shaft, an oscillating arm pivotally secured to said hoe-operative mechanism and operated thereby, a hoe adjustably secured to said arm, a means secured to said oscillating arm whereby said arm and the hoe carried thereby may be shifted at any time relative to said hoe operative mechanism, a means secured to said frame whereby it may be elevated and lowered relative to the frame work and fixed relative thereto, at any desired point of elevation, and a resilient member secured to said frame work and frame whereby the latter is suspended from the former.

9. A device of the character described including a frame work pivotally mounted upon a rotatable axle and carrier wheels rigidly secured to said axle, a supporting frame hingedly secured to said frame work, a transverse shaft rotatable in suitable bearings carried by said frame work and a lengthwise shaft rotatably mounted in suitable bearings in said frame, a fly wheel secured upon said lengthwise shaft, means operatively connecting one of said carrier wheels with said transverse shaft and means for disconnecting said connection, means operatively connecting said transverse and lengthwise shafts, a hoe-operative mechanism carried by said frame and operatively connected with said lengthwise shaft, an oscillating arm pivotally secured to said hoe operative mechanism and operated thereby, a hoe adjustably secured to said arm, a means secured to said oscillating arm whereby said arm and the hoe carried thereby may be readily shifted at any time toward and from said hoe operative mechanism, a means secured to said frame whereby it may be elevated and lowered relative to the frame work and fixed at any desired point of elevation relative thereto, a resilient member secured to said frame work and frame whereby the latter is suspended from the former, and supporting rollers carried by the frame and depending therefrom.

10. A device of the character described composed of suitable carrier wheels rigidly mounted on a rotatable axle, a frame work supported by said axle, a frame hingedly secured to the frame work and carrying a hoe operative mechanism, an oscillating arm pivotally secured to said mechanism and a hoe carried thereby, a means operatively connected with one of said carrier wheels and also having operative connection with said hoe operative mechanism, means for disconnecting said first mentioned means from said carrier wheel, a mechanism operatively connected to said oscillating arm for changing the position of said arm and the hoe carried thereby relative to the hoe operative mechanism, and a scraper secured to the frame and extending toward the hoe and arranged to contact therewith during the upward stroke of said hoe.

11. In a device of the character described a plurality of intermeshing gears and a means for imparting rotation to one of said gears, an oscillating arm pivotally attached to one of said gears and having a slidable engagement with the other of said gears and a hoe secured to the free end of said arm.

In testimony whereof I have signed my name to this specification in the presence of two subscribing witnesses.

GEORGE P. A. WEISENBORN.

Witnesses:
J. W. YEAGLEY,
ANNIE TOMPKINS.